United States Patent Office 2,952,403
Patented Sept. 13, 1960

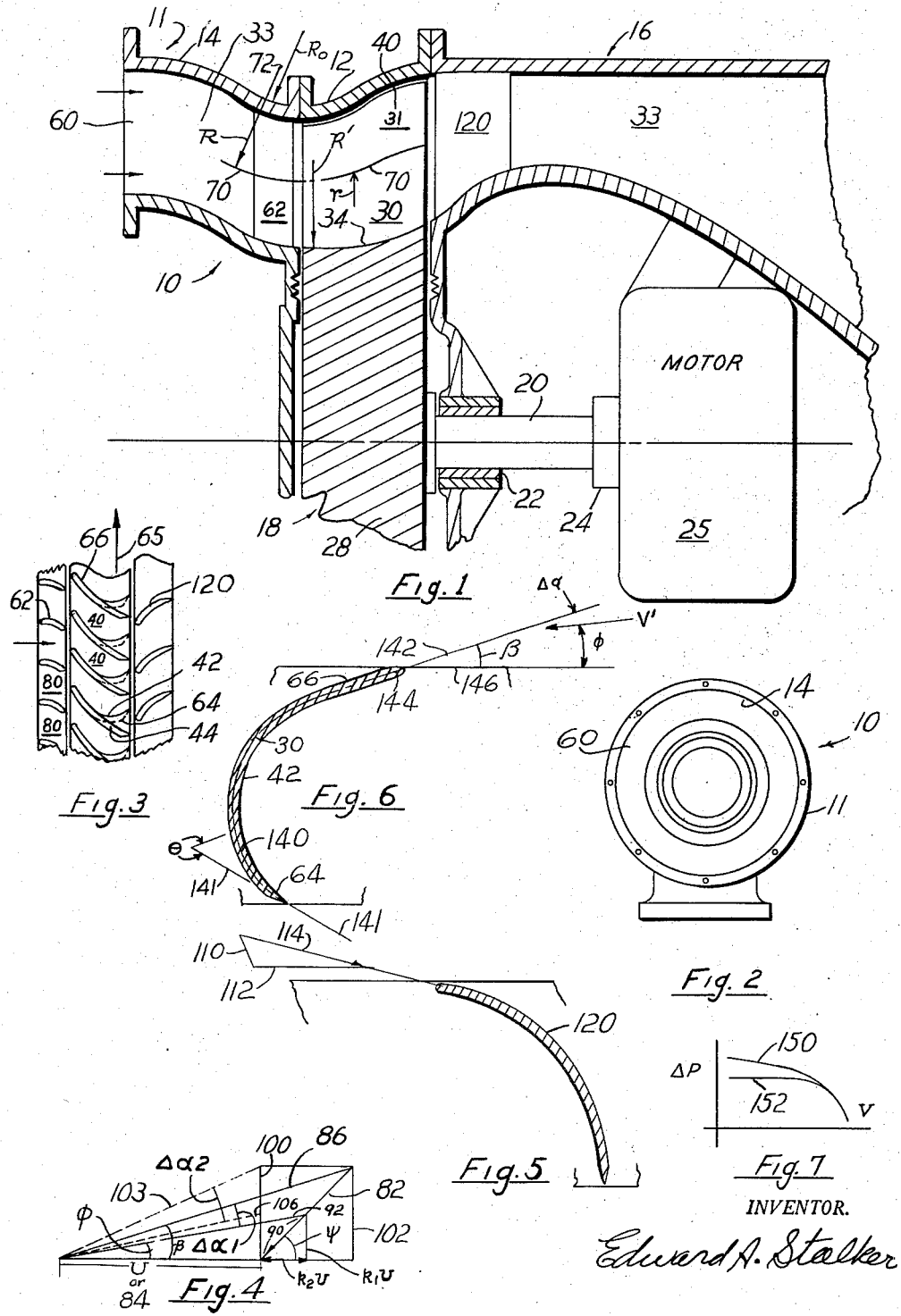

2,952,403
ELASTIC FLUID MACHINE FOR INCREASING
THE PRESSURE OF A FLUID

Edward A. Stalker, 406 N. Farragut St.,
Bay City, Mich.

Filed Apr. 22, 1954, Ser. No. 424,861

7 Claims. (Cl. 230—120)

This invention relates to compressors, blowers, and the like of the axial flow type.

An object of the invention is to provide a compressor of high efficiency over a wide range of volume flow per revolution.

Another object is to provide a compressor having sheet stock blades for economical fabrication.

Still another object is to provide a compressor for creating a large static pressure rise and a large range of volume flow per revolution at high efficiency.

Other objects will appear from the description, drawings and claims.

The above objects are accomplished by the means illustrated in the accompanying drawings in which—

Fig. 1 is a fragmentary axial section through a compressor according to this invention representing a preferred form thereof;

Fig. 2 is a front view of the compressor of Fig. 1;

Fig. 3 is a fragmentary development of the blading of the rotor and the guide vanes;

Fig. 4 is a diagram of the fluid flow vectors pertaining to the inlet guide vanes and the rotor blades of this invention;

Fig. 5 is a diagram of fluid flow vectors relative to a stator blade;

Fig. 6 is a chordwise section through a rotor blade at the root end thereof; and Fig. 7 is a graph of pressure rise in the pumped fluid versus volume of flow per revolution.

In this invention the blades of the rotor preferably have passages between them which expand greatly in cross sectional area and in radial depth so that a large static pressure rise occurs in these passages. The rotation of the rotor tends to cause a large rotational centrifugal pressure of the rotor near the tips of the blades arising from centrifugal action on the radially extending column of fluid between the blades, especially that portion of the column adjacent to the rear end of the rotors. This pressure, if allowed to exist, would cause a reduction in flow through the rotor and at the tips of the stator blades would cause very flat angles of approach to them, leading to inefficiencies.

Where inlet guide vanes are used to put a whirl into the pumped fluid a similar unfavorable condition exists in the passages between vanes.

In this invention provision is made to offset the undesirable features which would result from a large static pressure rise in the rotor and the counterwhirl in the inlet guide vanes by shaping the guiding surfaces of the case and rotor to provide a negative centrifugal pressure, that is, one acting radially inward.

The combination of counter rotation inlet guide vanes, rotor configuration, and a unique stator provides a compressor which can discharge its flow of fluid axially with high efficiency and pressure over a wide range of volume flow per revolution.

Referring now to the drawings, the compressor is indicated generally as 10 in Figs. 1 and 2. It has the case means 11 comprised of the rotor case 12, the inlet duct 14, and the exit duct 16. The rotor 18 is mounted on the shaft 20 supported in the bearings 22 and 24 to be driven by motor 25. The rotor hub 28 carries the rotor blades 30 peripherally spaced about the rim 34. The rotor hub defines with the rotor case a portion 31 of the annular channel 33 which conducts the main flow of fluid through the compressor. The blades are contoured to the inside surface of the case and preferably conform to this surface along substantially their whole tip length.

The blades have the rotor flow passages 40 between them and are shaped to give a large diffusion ratio to these passages. With a large diffusion ratio the velocity at the exit of each passage is small compared to the velocity at the corresponding inlet. Then the flow leaving the rotor has a very small axial velocity and the direction of the absolute velocity makes a small angle with the plane of rotation. This small angle makes the provision of an efficient stator difficult.

As shown in Figs. 1 and 3 the blades 30 have a very large curvature in their root sections 42 and substantially less curvature at their tip sections 44. Because of the curvature in the blades and their increasing radial depth rearward the cross sectional widths of the passages increase rearward, that is downstream, so that each exit cross sectional area $A_2$ is much larger than the corresponding inlet cross sectional area $A_1$. The diffusion ratio is the ratio of $A_2$ to $A_1$. Preferably this should be of the order of 1.3 or more.

When the rotor is rotated fluid enters the compressor inlet opening 60, Fig. 1 and flows through the inlet guide vanes 62 into the rotor passages 40. In the rotor the centrifugal pressure due to rotation about the axis tends to create a substantial static pressure rise in the region of the blade tips in addition to the rise due to diffusion. Because of the resulting balance of pressures and energies along the radius or span of the blades the mass flow through the rotor at the tip ends of the blades will be relatively small. This is very undesirable with respect to the efficiency of both the rotor and the stator.

In this invention the mass flow through the rotor in the neighborhood of the blade tips is increased by creating a pressure to offset, at least in part, the centrifugal pressure arising from the rotation of the rotor. This is accomplished in part by giving the inlet duct a negative curvature about one or more centers lying away from the axis of rotation. Thus in Fig. 1 the radius of curvature R of the center line 70 of the passage has its center at 72 on the far side of this center line from the axis of rotation of shaft 20. That is, the inlet duct in the region of the inlet vanes 62 has its walls formed such that the mean line of the duct is curved in an axial plane, i.e., the plane including the axis of rotation, in a direction convex to such axis, as shown by line 70 in Fig. 1.

When the pumped fluid is drawn into the inlet duct a negative centrifugal pressure is created acting toward the axis of rotation, that is, in opposition to the centrifugal pressure from the rotation about the shaft axis. Due to the inertia of the fluid this centrifugal pressure can persist into the rotor and reinforce the negative centrifugal pressure from the curvature of the hub rim. These pressures influence the flow leaving the rotor.

When the centrifugal pressure from rotor rotation is offset by the negative centrifugal pressure arising from negative curvature of the flow in axial planes, more fluid flows through the rotor at the outer ends or tips of the blades. This increases the efficiency of the rotor and of the stator downstream therefrom. This is particularly important where the radial depth of the passage is larger at the exit than at the inlet because of the added diffusion. The efficiency of the rotor is increased because there is a greater pressure rise near the root ends of the blades away from the case and the gaps between the blade tips and the case.

The efficiency of the stator is increased because of the greater inlet angle of the stator blades.

Besides improving the flow through the rotor, the curved inlet surfaces of the case means also improves the action of the inlet guide vanes 62 which are also designed to cause a rotation of the fluid about the shaft axis. This is discussed further subsequently.

In order to achieve a very high total head pressure ratio the rotor blades, Fig. 3, preferably have large portions thereof curved chordwise to present a concave side toward the direction of rotation so that their aft ends 64 are directed more nearly parallel to the axis of rotation (axis of shaft 20) than to the direction of the nose portion 66 or ahead of the axis referred to the direction of rotation 65. The curvature and the increasing radial depths increase the cross sectional areas of the exits of the rotor passages relative to their inlet areas which diffuses the fluid flow and increases the density of the fluid in the rotor passages. In turn this tends to increase the rotational centrifugal pressure of the rotor adjacent to the blade tips which as remarked earlier is undesirable. Consequently an inlet duct curvature to oppose the rotational centrifugal pressure of the rotor becomes very significant with curved blades and particularly so with curved blades of large solidity at their root ends, since the closer the blades are spaced the greater effect the blades have on the fluid flowing between them. Also the greater the radial depth the greater the outward centrifugal pressure. The solidity is the ratio of the sum of the blade chord lengths to the circumference of a circle at the radial level of said chords.

The blades are preferably placed close together to achieve a solidity greater than about one at the mean line 70 and preferably greater than 2 and less than 10. It is also preferable that the leading edge of the leading blade of a pair of rotor blades be forward (upstream) of about the mid point of the chord of the following blade.

With the blades close together it is desirable to make the blades thin and with blade sections of constant thickness throughout substantially their whole chordwise length to exclude constricting throats in the passages between the blades. These considerations also lead to the selection of sheet stock blades with their low costs of fabrication.

These large turning angles $\theta$ of the rotor blades, Fig. 6, are facilitated by the increasing diameter of the hub rim surface. $\theta$ Is the angle between the tangents to the mean camber line at the leading and trailing edges, 142 and 141 respectively, Fig. 5. As shown in Fig. 1 the rim diameter at the rear side of the hub is substantially larger than at the front side.

The radially outward divergence of the rim serves to control the rate of diffusion of the flow along the root portions of the blades.

The smaller the pitch angle $\beta$ (measured between the tangent 142 and the plane of rotation) the smaller is the angle $\theta$ through which the blade can be curved.

In order to extend the range of volume flow per revolution of the rotor, the inlet guide vanes 62 (Fig. 3) are curved backward relative to the direction of rotation of the rotor 18. Thus the vanes deflect or rotate the flow of fluid coming through their passages 80 in a peripheral direction counter to the direction of rotation of the rotor blades 30.

In Fig. 4 the flow vector aft of the inlet guide vanes is 82 when the compressor is passing 100% of the mass flow for which it is designed. The peripheral velocity of segments of the rotor blades at as elected radius is 84 or U, and the flow vector relative to the segments is then 86. If for instance the volume of flow through the compressor is decreased 50% as it may be in the course of its use the vector of the flow leaving the vanes may be represented by 90. Then the flow vector relative to the segments of the rotor blades will be 92 and the change in angle of incidence of each segment will be $\Delta\alpha_1$. The angle of incidence is measured between the relative flow velocity vector V' and the tangent to the mean camber line at the blade nose. See Fig. 5.

If vanes were employed which gave no whirl to the fluid the vector for fluid leaving the vanes would be 100 (Fig. 4) equal to the axial velocity component 102 of vector 82. For the same peripheral component 84 the relative velocity is 103. If the volume of the flow is decreased by 50% the new relative vector is 106 making the change in angle of incidence $\Delta\alpha_2$.

A comparison in Fig. 4 of the changes in angle of incidence, $\Delta\alpha_1$, with $\Delta\alpha_2$, shows that with backward curved vanes the change in angle of incidence is only about one-half of the change for zero backward curvature which would give no whirl to the fluid leaving the vanes. This relationship can also be shown by calculation of the changes in angle of incidence.

As shown in Fig. 4 the peripheral component of the velocity of the fluid leaving the inlet guide vanes can be expressed as $k_2$ times U. The axial component can be expressed as $k_1$ U. $\psi$ is the angle between the flow vector from the inlet guide vanes and the plane of rotation. $\phi$ is the angle between the relative vector V' and the plane of rotation. Then $$\tan \psi = \frac{k_1 U}{k_2 U} \tag{1}$$

and $$\tan \phi = \frac{k_1 U}{U + k_2 U} \tag{2}$$

whence $$\tan \phi = \frac{k_2}{1+k_2} \tan \psi$$

and $$\Delta\alpha = \beta - \phi \tag{4}$$

Table I shows the changes in angle of incidence $\Delta\alpha_1$, for the compressor with counter whirl vanes and $\Delta\alpha_2$, for vanes providing axial flow. These are calculated according to Equations 1–4. In each case the axial velocities at the selected conditions are equal. $k_1 = k_2$ and $k_1/k_2 = 1$. The axial velocities are proportional to $k_1$, since the peripheral velocity U is the same in both cases.

Table I

| $k_1$ | $\Delta\alpha_1$ | $\Delta\alpha_2$ |
| --- | --- | --- |
| .4 |  | 23°–10′. |
| .6 | 10°–40′ | 14°–0′. |
| .8 | 6°–6′ | 6°–20′. |
| 1.0 | 2°–4′ | 0–0. |
|  | 0–0 |  |

It is clear from this table that the counter whirl inlet vanes greatly reduce the changes in angle of incidence.

It can also be shown for a small value of $\beta$ that $\Delta\alpha$ remains substantially constant and small for a wide variation in axial velocity which determines the magnitude of the volume of flow through the compressor.

By using the backward curved vanes in proper relation to the other geometric variables the axial flow rotor is made to function over a wide range of volume flow with a sufficiently small variation in angle of incidence to preclude separation of the flow from the blade surfaces. This insures high pressure rises and high efficiency over the useful range of operation.

It may be deduced from the equations that the smaller the angle $\psi$ the less variation there will be in the angle of incidence $\alpha$ for a given percentage variation in the axial velocity which determines the volume flow. Accordingly it is desirable for the best results to make $\psi$ less than about 65° and the pitch angle $\beta$ less than about 35°. If it is desired to sustain a high pressure rise substantially to the condition of zero volume flow, the pitch angle $\beta$ may be made about equal to the stall angle of incidence of the blades, that is about 12 to 16 degrees or less. This is the angle at which the flow separates from the convex side of the blade.

Since the counterflow inlet guide vanes limit the range of angles of incidence required by the blades of the rotor the latter can be made of thin sheet metal and function with high efficiency over a large range of operation.

The flow leaves the rotor with the relative velocity 110. See Fig. 5. The peripheral velocity of the rotor blade is 112 giving the vector 114 relative to the stator blades 120. These straighten out the flow and direct it substantially axially along the exit duct portion of 33, Fig. 1.

The preferred magnitude of the radius R of the curvature of the center line 70 is related to the pitch angle $\beta$ of the rotor blades at the center line 70.

The outward centrifugal pressure at the mean line 70 due to the rotation of the rotor about the rotor axis is closely $$C.P. = \frac{\rho U^2}{r}$$

where $\rho$ is the mass density of the fluid, U is the peripheral velocity at center line 70 and $r$ is the radius to this center line.

As shown in Fig. 4 the axial velocity entering the rotor passages is U tan $\beta$. The inward centrifugal pressure at the mean or center line 70 due to curvature of the flow at radius R is then closely $$\frac{\rho U^2 \tan^2 \beta}{R} \quad (5)$$

These two pressures should be equal. That is $$\frac{\rho U^2}{r} = \frac{\rho U^2 \tan^2 \beta}{R} \quad (6)$$

whence $$R = r \tan^2 \beta \quad (7)$$

Some variation on either side of this value of R will still produce improved performance. The radius R should lie between the limits $$R_1 = r \tan^2(\beta + 15°) \quad (8)$$

and $$R_2 = r \tan^2(\beta - 0.5\beta) \quad (9)$$

Preferably the radii $R_0$ of the outer case 12 should be equal to the radius R to the mean line 70 reduced by one-half the blade height. However it may be less than R by greater amounts.

The radius R' to the concave surface of the hub rim should be equal to R plus one-half the blade span. The centers of the various radii need not coincide.

When the blades have a thin constant thickness blade section such as sheet metal provides, the range of volume flow per revolution tends to be limited by these characteristics. It is especially important then with this type of blade section to employ means to extend the range of the rotor blades. In this invention this is accomplished in part by the use of the counter flow guide vanes and the negative curvature in the passage of the inlet and rotor as already described.

An enlarged root section of a rotor blade 30 is shown in Fig. 6 of the preferred cross sectional shape. It has a mean camber line 140 which is preferably curved more along the rear part. Angles of incidence $\alpha$ are to be referred to the tangent 142 to the mean camber line at the center 144 of the nose radius.

For economy of construction and to facilitate close peripheral spacing of the blade they are preferably made with blade sections of substantially constant thickness from substantially the leading edge to the trailing edge. As shown in Fig. 6 each blade has a constant thickness chordwise with faired nose and tail portions. These portions extend inward from the blade edges by one or more times the blade thickness and are preferably limited to a small length equal to only several times the blade thickness.

The forward portions of the blades are preferably directed more nearly parallel to the plane of rotation 146 (see Fig. 6) than normal thereto, as determined by the direction of the tangent to the mean camber line of the fore portion relative to the plane of rotation. Preferably the aft portion, as determined by its tangent 141 to its mean camber line is curved in a direction beyond a line parallel with the axis and toward the direction of rotation.

The machines of this invention are for use in moving large volumes of elastic fluid against substantial back pressures. Accordingly the tips of the blades fit closely to and conform to the contours of the surface of the case adjacent to them.

Furthermore the ratio of the maximum radius of the hub to the radius of the blade tips is preferably greater than 0.5 to preclude back-flow in the region adjacent to the blade roots. The blade roots are highly cambered to serve this same purpose.

The passages between the rotor blades can have a large ratio of exit to inlet cross sectional area which is achieved by a greater radial depth at the exit than at the inlet and preferably also by curving the blades along the chord direction.

The increasing radial depth particularly tends to induce a large diffusion of the flow in the vicinity of the case and a corresponding increase in the static pressure. Also the centrifugal pressure arising from the rotation of the fluid imparted by the rotor blades tends to augment the static pressure from the diffusion. Furthermore the flow in an axial plane along the case is convex causing an increment of centrifugal pressure acting radially outward. These pressures tend to reduce the volume of flow through the outer portions of the channel between the hub and the case.

A reduction in volume of flow is very disadvantageous but in addition, the low axial velocity of the flow at the rotor exit would cause a very small angle of approach to the stator blades and lowered efficiencies in turning the flow to the general axial direction.

Effects of high pressures at the fluid tips also would extend upstream and adversely effect the angles of incidence of the rotor blades.

In order to improve and extend the operational range of angles of incidence of the rotor blades, inlet guide vanes are provided to give the fluid flow a prewhirl counter to the direction of the rotor. However such a prewhirl sets up centrifugal pressure toward the outer ends of the blades tending to limit the volume of flow.

For low cost it is desirable to make the blades of sheet stock like sheet metal. Such blades tend to have a limited useful range of angles of incidence tending to limit the volume flow per revolution of the rotor.

In order to establish the angles of incidence and the volume flow per revolution at desirable values the walls of the case means are curved in axial planes to give a centrifugal pressure acting toward the axis of rotation of the rotor to oppose the rotational centrifugal and other pressures in the region of the rotor blade tips and the outer portions of the vane flow passages 80.

Thus the negatively curved case means and the radial diffusion rotor cooperate to increase the volume flow. Where an exit stator is employed to straighten the flow leaving the rotor, the case means cooperates with the rotor to improve the angles of approach to the stator blades thereby increasing the range of volume flow. The range of volume flow is also increased by the counter flow inlet guide vanes which cooperate with the rotor blades to reduce the range of angles of incidence required for a large increase in the volume flow. The case means also cooperates with the inlet guide to reduce or oppose their tendency to build up centrifugal pressure at their outer ends. Thus the case means, rotor, inlet guide vanes and stators all cooperate to produce a large volume flow and a large range of volume flow per revolution of the rotor. They also cooperate with the blades so that they may be made cheaply from sheet stock and provide a large range of volume flow per revolution.

It is desirable to have a graph of pressure rise ΔP versus volume per revolution V like 150 in Fig. 7. If as shown the curve has everywhere a negative slope the operation of the compressor will be stable. That is it will exclude surging. The curve preferably should be at least horizontal as shown by 152 although some positive slope in some installations can be tolerated particularly near the end of the curve for very small volume of flow. To achieve at least a horizontal curve close to the conditions of zero flow the pitch angle should be less than about 16°.

The compressor of this invention is of the axial flow type characterized by rotor flow passages extending in the general radial direction to an exit facing in the general axial direction for discharging fluid in the general axial direction. As viewed in the axial direction the exit and inlet of each rotor passage overlaps substantially.

It will now be clear that I have disclosed a unique machine for efficiently increasing the pressure of a fluid to relatively large values while providing a wide range of volume flow per revolution.

While I have illustrated a specific form in this invention it is to be understood that I do not intend to limit myself to this exact form but intend to claim my invention broadly as indicated by the appended claims.

I claim:

1. In combination in an axial flow compressor for raising the pressure of an elastic fluid, a case means defining an inlet duct, a rotor case, and an exit duct, a rotor hub mounted in said rotor case for rotation about an axis and defining a flow channel with said rotor case, said channel registering with said inlet duct and said exit duct to conduct a flow of fluid, a plurality of peripherally spaced axial flow blades carried on said hub with rotor flow passages between said blades, said blades increasing rearward in radial depth providing each said passage with a greater cross sectional area and radial depth at its exit than at its inlet, the inlets and exits of said rotor flow passages overlapping in axial view, said blades being of sheet stock defining blade sections of constant thickness chordwise along substantially the whole chord length thereof, the radially inner portions of said blades having their fore portions directed more nearly along the plane of rotation than normal thereto and having their rear portions curved in a direction beyond a line parallel with said axis and toward the direction of rotation, said blades tending to limit the range of volume flow of said fluid, a plurality of curved vanes positioned in said inlet duct upstream adjacent said rotor and extending in a generally radial direction, said vanes being positioned to direct fluid toward said rotor blades counter to their direction of rotation, said vanes tending to cause an increase in static pressure away from said axis toward the tip ends of said vanes by centrifugal action which tends to limit the range of volume flow of said fluid, said inlet duct in the region of said vanes having its walls formed such that its mean line in an axial plane is curved in a direction convex to said axis to create a centrifugal pressure in said fluid toward said axis to offset said increase in static pressure at said vanes, said wall and said vanes cooperating with said rotor to extend the range of volume flow of said fluid through said rotor.

2. In combination in an axial flow compressor for raising the pressure of an elastic fluid, a case means defining an inlet duct, a rotor case, and an exit duct, a rotor hub mounted in said rotor case for rotation about an axis and defining a flow channel with said rotor case, said channel registering with said inlet duct and said exit duct to conduct a flow of fluid, a plurality of peripherally spaced axial flow blades curved in a direction concave to the direction of rotation and carried on said hub defining a rotor with rotor flow passages between said blades, said blades increasing rearward in radial depth providing each said passage with a greater cross sectional area and radial depth at its exit than at its inlet, the exits and inlets of said rotor flow passages overlapping in axial view, said blades being curved chordwise to define with said radial depths a cross sectional area at said exit of each said passage greater than about 1.3 times the cross sectional area at the inlet thereof to increase the static pressure of said fluid therein and tending to limit the range of volume flow through said rotor passages near the outer ends of said blades thereof, said hub having a concave rim for establishing a centrifugal pressure in said rotor passages acting toward said axis, a plurality of curved vanes positioned in said inlet duct upstream adjacent said rotor and extending in a generally radial direction, said vanes being positioned to direct fluid toward said rotor blades counter to their direction of rotation, said vanes tending to cause an increase in static pressure away from said axis toward the tip ends of said vanes by centrifugal action which tends to limit the range of volume flow of said fluid, said inlet duct in the region of said vanes having a wall curved convexly to said axis in axial planes to create a centrifugal pressure toward said axis to offset said increase in static pressure at said vanes, said vanes and said inlet duct and said hub rim cooperating to extend the range of volume flow of said fluid through said rotor passages.

3. In combination in an axial flow compressor for raising the pressure of an elastic fluid, a case means comprising an inlet duct, a rotor case and an exit stator duct having a closed outer wall, a rotor hub mounted in said rotor case for rotation about an axis and defining a flow channel with said rotor case, said channel extending in the general axial direction and registering with said inlet duct and said exit duct to conduct a flow of fluid, a plurality of peripherally spaced axial flow blades carried on said hub defining a rotor with rotor flow passages between said blades having exits to discharge the flow therefrom in a general axial direction, said blades increasing rearward in radial depth providing each said passage with a greater cross sectional area and radial depth at its exit than at its inlet, the exits and inlets of said rotor flow passages overlapping in axial view, a plurality of exit stator blades peripherally spaced across said stator duct within said closed outer wall defining a stator, said rotor blades tending to create centrifugal pressures toward the regions at the tips of said blades tending to limit the range of fluid volume flow through said rotor and stator near the outer ends of said blades thereof, and means to extend said range of fluid volume flow in said compressor comprising a plurality of curved vanes positioned in said inlet duct upstream adjacent said rotor and extending in a radial direction, said vanes being positioned to direct fluid toward said rotor blades counter to their direction of rotation, said inlet duct in the region of said vanes having curved walls convex toward said axis to create a centrifugal pressure toward said axis to offset said centrifugal pressure in the region near said rotor blade tips and improve the efficiency and operation of the portions of said stator blades receiving fluid from said region, the effects of said vanes and inlet duct on said fluid persisting up to said stators in operation of said compressor.

4. In combination in an axial flow compressor for raising the pressure of an elastic fluid, a case means comprising an inlet duct, a rotor case and an exit duct, a rotor hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, said rotor passages being bounded by said case, said hub and said blades, each said rotor blade having increasing radial length rearward along said passages providing each said rotor passage with a greater radial depth and cross sectional area at the exit thereof than at the inlet thereof, said inlet duct immediately upstream of said blades having its mean line curved in axial planes along said guide vane passages to be convex to said axis of rotation for producing a centrifugal pressure in said fluid toward said axis in said guide vane passages, a plurality of axial flow guide vanes positioned in said inlet duct upstream adjacent to said rotor with guide vane flow passages between said vanes, said vanes being angularly positioned to direct fluid counter to the direction of rotation of said rotor blades to increase the range of volume flow per revolution of said rotor, and a plurality of peripherally spaced stator blades in said exit duct with stator flow passages therebetween for receiving said fluid from said rotor passages the radially inner wall of said exit duct diverging radially outward relative to said axis reducing the radial depths and cross sectional areas of said stator passages to accelerate flows of said fluid therein to provide a greater range of angles of attack for said stator blades and accommodate said increased range of volume flow of said fluid through said rotor passages, said guide vanes and stator blades cooperating to increase the range of volume flow through said compressor.

5. In combination in an axial flow compressor for raising the pressure of an elastic fluid, a case means comprising an inlet duct, a rotor case and an exit duct, a rotor hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, said rotor passages being bounded by said case, said hub and said blades, each said rotor blade having increasing radial depth rearward along said rotor passages providing each said rotor passage with a greater cross sectional area and radial depth at the exit thereof than at the inlet thereof and tending to reduce the volume flow of fluid through said rotor passages, a plurality of axial flow guide vanes positioned in said inlet duct upstream adjacent to said rotor with guide vane flow passages between said vanes, said vanes being angularly positioned to direct fluid toward said rotor blades counter to the direction of rotation thereof to increase the range of volume flow per revolution of said rotor, said inlet duct having the mean line thereof curved in an axial plane along said guide vane passages to be convex to said axis of rotation for producing a centrifugal pressure in said fluid toward said axis in said guide vane passages, and a plurality of peripherally spaced stator blades in said exit duct with stator flow passages therebetween for receiving said fluid from said rotor passages, the radially inner wall of said exit duct diverging radially outward relative to said axis and toward the outer wall thereof along said stator blades reducing the cross sectional area and radial depths of said stator passages to accelerate flows of said fluid therein to provide a greater range of angles of attack for said stator blades and accommodate said increased range of volume flow of said fluid through said rotor passages, said guide vanes and stator blades cooperating to increase the range of volume flow through said compressor.

6. In combination in an axial flow compressor for raising the pressure of an elastic fluid, a case means comprising an inlet duct, a rotor case and an exit duct, a rotor hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, said rotor passages being bounded by said case, said hub and said blades, each said rotor blade having increasing radial length rearward along said passages providing each said rotor passage with a greater radial depth and cross sectional area at the exit thereof than at the inlet thereof, a plurality of axial flow guide vanes positioned in said inlet duct upstream adjacent to said rotor with guide vane flow passages between said vanes, said vanes being angularly positioned to direct fluid counter to the direction of rotation of said rotor blades to increase the range of volume flow per revolution of said rotor, and a plurality of peripherally spaced stator blades in said exit duct with stator flow passages therebetween for receiving said fluid from said rotor passages, the portion of the radially inner wall of said exit duct along said stator blades diverging radially outward relative to said axis and toward the outer wall thereof reducing the radial depths and cross sectional areas of said stator passages to accelerate flows of said fluid therein to provide a greater range of angles of attack for said stator blades and accommodate said increased range of volume flow of said fluid through said rotor passages, said guide vanes and stator blades cooperating to increase the range of volume flow through said compressor.

7. In combination in an axial flow compressor for raising the pressure of an elastic fluid, a case means comprising an inlet duct, a rotor case and an exit duct, a rotor hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, said rotor passages being bounded by said case, said hub and said blades, each said rotor blade having increasing radial depth rearward along said rotor passages providing each said rotor passage with a greater cross sectional area and radial depth at the exit thereof than at the inlet thereof and tending to reduce the volume flow of fluid through said rotor passages, a plurality of axial flow guide vanes positioned in said inlet duct upstream adjacent to said rotor with guide vane flow passages between said vanes, said vanes being angularly positioned to direct fluid toward said rotor blades counter to the direction of rotation thereof to increase the range of volume flow per revolution of said rotor, said inlet duct having the mean line thereof curved in an axial plane along said guide vane passages to be convex to said axis of rotation for producing a centrifugal pressure in said fluid toward said axis in said guide vane passages, said hub having a rim surface concave in an axial plane with the radius from said axis to said rim surface at the downstream side of said rotor greater than the radius to said surface at the front side of said rotor for producing a centrifugal pressure in said fluid in said rotor passages opposing the centrifugal pressure therein from rotation about said axis, and a plurality of peripherally spaced stator blades in said exit duct with stator flow passages therebetween for receiving said fluid from said rotor passages, the radially inner wall of said exit duct diverging radially outward relative to said axis and toward the outer wall thereof along said stator blades reducing the cross sectional areas and radial depths of said stator passages to accelerate flows of said fluid therein to provide a greater range of angles of attack for said stator blades and accommodate said increased range of volume flow of said fluid through said rotor passages, said guide vanes and stator blades cooperating to increase the range of volume flow through said compressor.

References Cited in the file of this patent

UNITED STATES PATENTS

| | | |
|---|---|---|
| 814,804 | Rateau | Mar. 13, 1906 |
| 1,734,541 | Tedman | Nov. 5, 1929 |
| 2,314,058 | Stalker | Mar. 16, 1943 |
| 2,397,060 | Szydlowski | Mar. 19, 1946 |
| 2,435,236 | Redding | Feb. 3, 1948 |
| 2,436,087 | Benson | Feb. 17, 1948 |
| 2,609,141 | Aue | Sept. 2, 1952 |
| 2,623,688 | Davidson | Dec. 30, 1952 |
| 2,628,768 | Kantrowitz | Feb. 17, 1953 |
| 2,650,060 | Stalker | Aug. 25, 1953 |
| 2,659,528 | Price | Nov. 17, 1953 |

FOREIGN PATENTS

| | | |
|---|---|---|
| 375,065 | Germany | May 8, 1923 |
| 386,039 | Great Britain | Jan. 12, 1933 |
| 546,417 | France | Nov. 10, 1922 |
| 634,561 | Great Britain | Mar. 22, 1950 |
| 724,553 | Germany | Aug. 29, 1942 |
| 1,012,091 | France | Apr. 9, 1952 |
| 1,017,514 | France | Sept. 24, 1952 |
| 1,056,389 | France | Oct. 21, 1953 |